United States Patent
Trezevant et al.

(10) Patent No.: US 8,237,719 B1
(45) Date of Patent: Aug. 7, 2012

(54) POSE-STRUCTURED ANIMATION INTERFACE

(75) Inventors: Warren Trezevant, Oakland, CA (US); Oren Jacob, Piedmont, CA (US); Robert Jensen, Berkeley, CA (US)

(73) Assignee: Pixar, Emeryville, CA (US)

( * ) Notice: Subject to any disclaimer, the term of this patent is extended or adjusted under 35 U.S.C. 154(b) by 744 days.

(21) Appl. No.: 12/364,586

(22) Filed: Feb. 3, 2009

(51) Int. Cl.
*G06T 13/00* (2011.01)
(52) U.S. Cl. ....................................... 345/473
(58) Field of Classification Search .................. None
See application file for complete search history.

(56) References Cited

U.S. PATENT DOCUMENTS

2005/0253849 A1 * 11/2005 Reddy et al. .................. 345/473
* cited by examiner

*Primary Examiner* — Jin-Cheng Wang
*Assistant Examiner* — Weiming He
(74) *Attorney, Agent, or Firm* — Patterson & Sheridan, LLP

(57) ABSTRACT

Animation software enables the creation and manipulation of animation in terms of relationships between poses, as opposed to discrete values of computer graphics variable knots. Poses are automatically associated with animation structures that define object pose or poses over a time interval, rather than at a single discrete time. Animation structures may define and manipulate animation data defined over time intervals as a unit, as opposed to a set of unrelated computer graphics variable knots. Animation structures may be used to block out the general form, timing, and rhythm of animations. Optional transition animation structures, pose anticipations, and pose reactions may be automatically or manually defined between adjacent pose hold durations. General parameters of an animation structure may be applied to create or modify the animation data associated with the animation structure. Operations on animation structures can be applied to all of the animation data included in these animation structures.

13 Claims, 8 Drawing Sheets

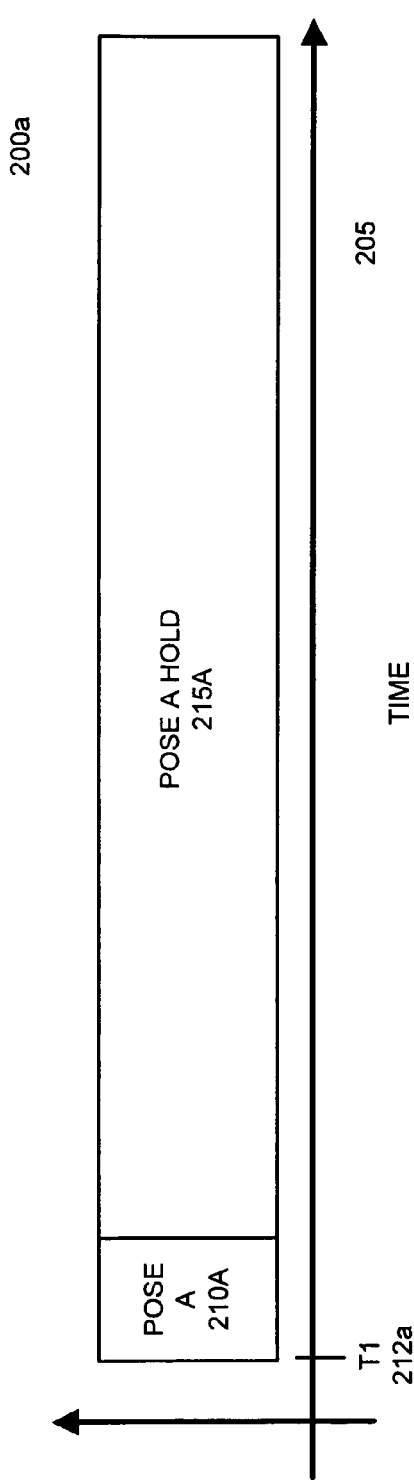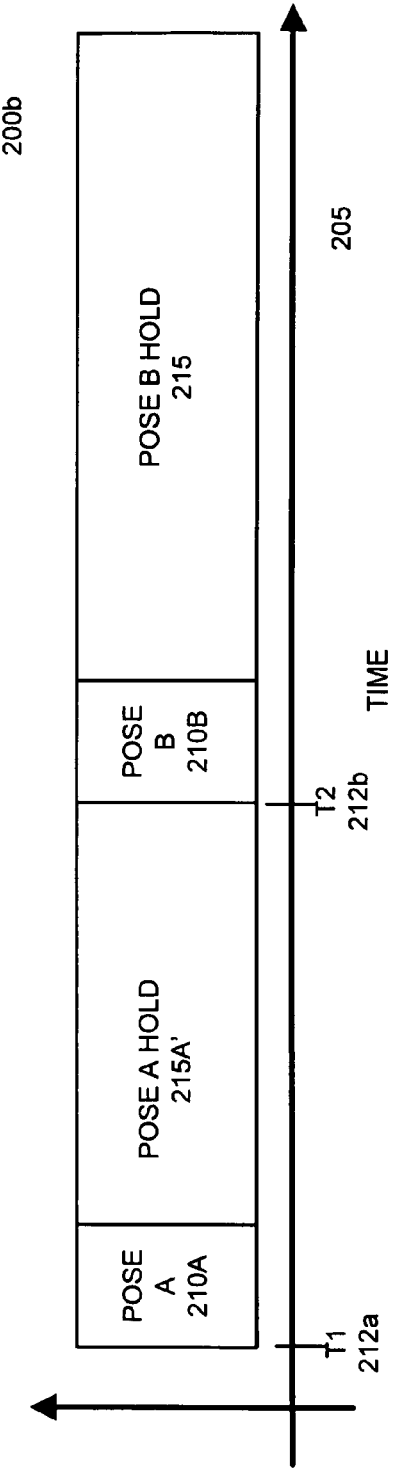

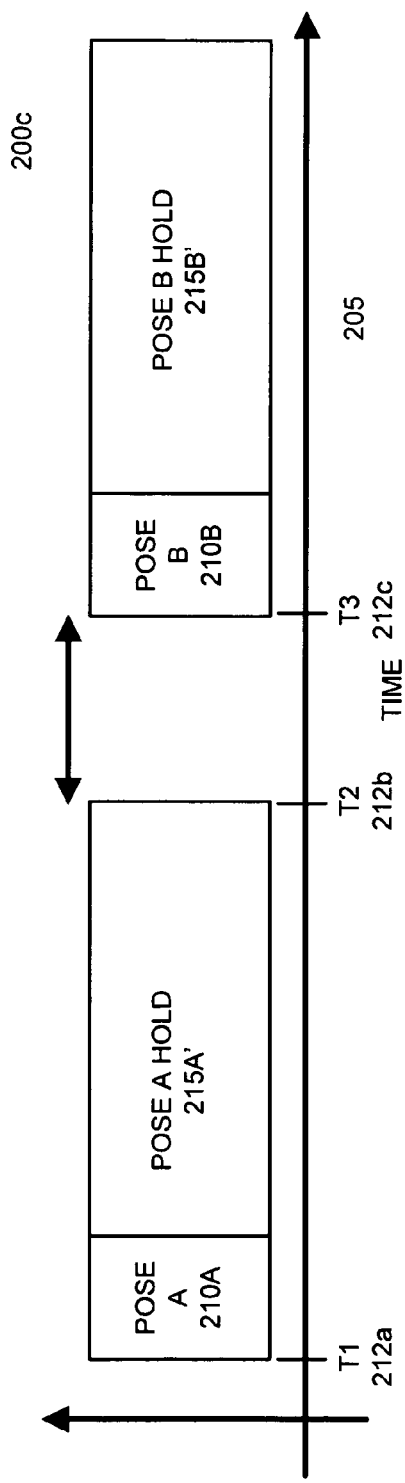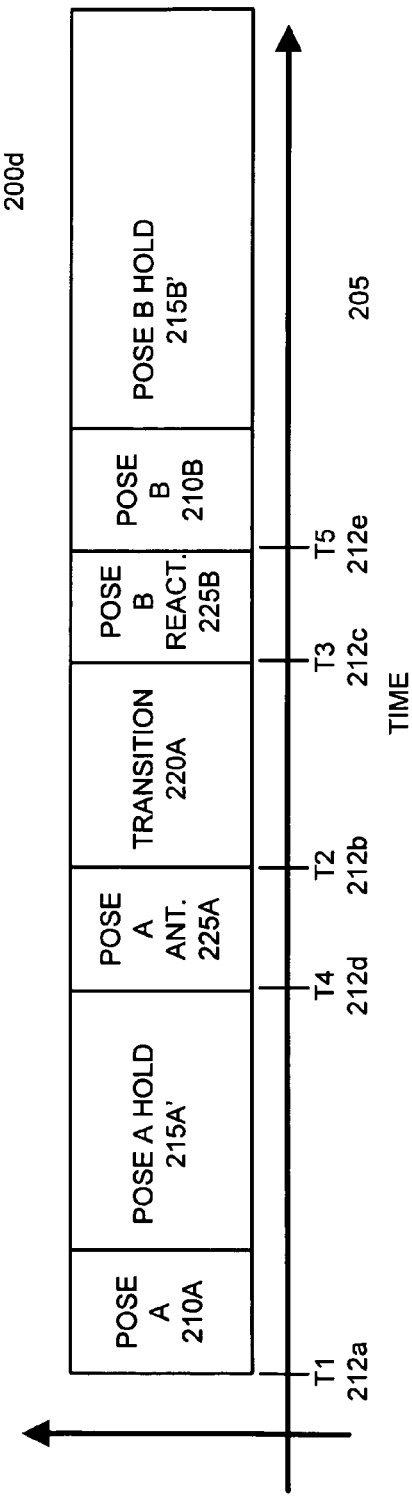
FIG. 2C
FIG. 2D

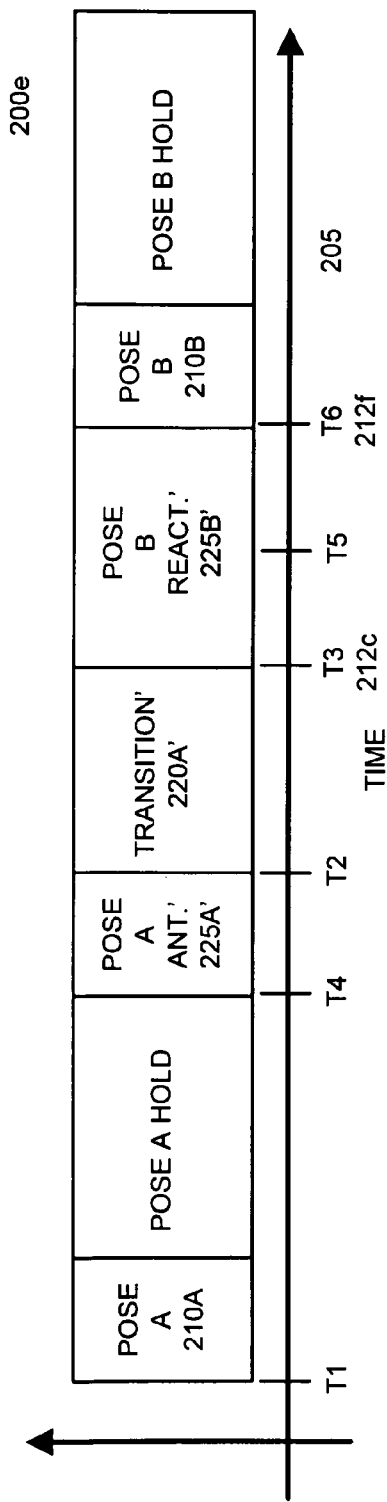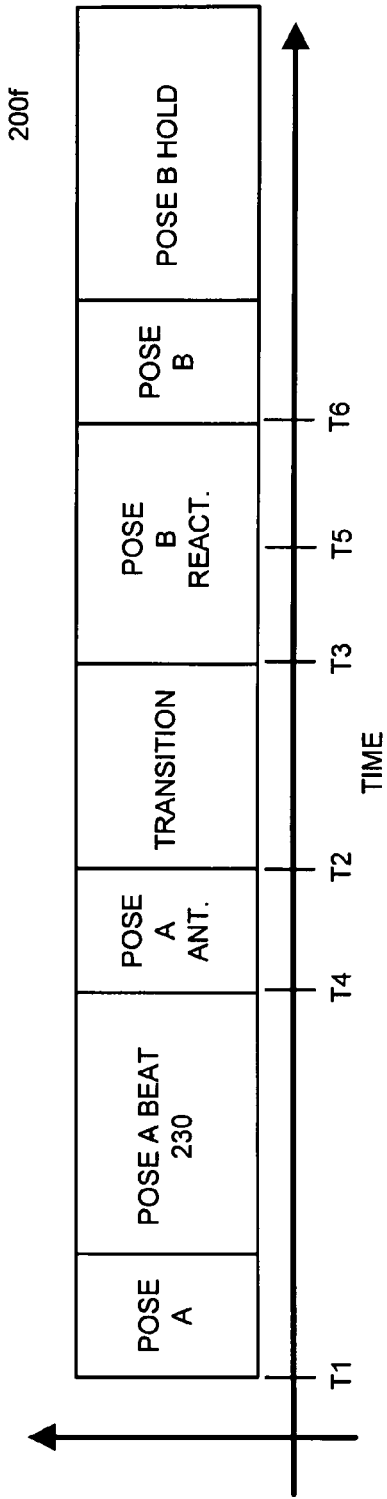

POSE-STRUCTURED ANIMATION INTERFACE

BACKGROUND

The present invention relates to the field of computer graphics, and in particular to methods and apparatus for authoring and editing animation of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a two or three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animation software tools often rely on computer graphics variables and associated computer graphics variable functions to define the attributes of objects. Examples of computer graphics variables include animation variables, shader relationships, weighting relationships, and mappings of influence between computer graphics components. Computer graphics variable functions associate input values to a corresponding output values according to some rule or mathematical expression. Computer graphics variable functions may be functions of an input time variable or any other type of input.

For example, animation variables, which are sometimes referred to as avars, are parameters used by functions to modify the position, or pose, of all or a portion of a model. Animation variables and their associated functions can specify relatively simple motions, such as the translation and rotation of objects. For example, animation variables can specify the rotation angles of the joints of a character model, thereby positioning the character model's limbs and appendages. Animation variables and their associated functions are also used to abstract complicated modifications to a model to a relatively simple control. For example, a complicated animation variable can define the degree of opening of a character's mouth. In this example, the value of a single animation variable is provided to one or more computer graphics variable functions to determine the positions of many different parts of the character model needed to open the characters mouth to the desired degree. In this example, animation software tools then modify the character model according to the outputs of the computer graphics variable functions to produce a character model posed with an open mouth.

In typical animation software applications, users define computer graphics images and animated sequences by specifying the values of computer graphics variables of an object, and hence the pose of an object, at one or more key frames. A computer graphics variable value and its associated input value, such as a time or frame value, is referred to as a knot. A set of one or more knots at a given input value defined by a user or another application, such as an inverse kinematic system, is referred to as an authored pose of an object.

Based on the authored poses of one or more objects, an animation system determines the poses of object for frames, time values, or any other type of input values where authored poses are not defined. Typically, animation systems interpolate the values of its computer graphics variables from the knots of authored knots. A variety of different interpolation schemes are used in animation, including linear, cubic, b-spline, Bezier, and Catmull-Rom. Typically, animation tools will display a line or curve, such as a spline curve, defined by one or more knots of a computer graphics variable and the interpolation scheme.

Precise control of the timing, rhythm, values, and interpolation of computer graphics variable knots is essential to achieving artistically effective animation. Subtle adjustments in the value, timing, and interpolation of knots can greatly change the artistic impact of animation. During animation, many gestures or actions are comprised of large numbers of knots from one or more computer graphics variables acting in concert to achieve the desired motion.

Despite the importance of timing, rhythm, values, and interpolation of computer graphics variable knots to achieve artistically effective animation, most animation software interfaces focus on the creation and manipulation of individual computer graphics knots, rather than the overall poses of an object. This makes it difficult for users to define and modify the timing, rhythm, values, and interpolation in terms of poses of an object, as opposed to individual knots.

SUMMARY

Embodiments of the invention include animation software that enables the creation and manipulation of animation in terms of relationships between poses, as opposed to the values of specific computer graphics variable knots. In one embodiment, poses are automatically associated with animation structures. An animation structure defines the pose or poses of an object over a time interval or duration, rather than at a single discrete time. Embodiments of the invention allow the manipulation of animation structures defined over time intervals as a unit, as opposed to a set of unrelated computer graphics variable knots.

In general, users and applications may define and edit the poses and timing of animation structures to block out the general form, timing, and rhythm of animations. Optional transition animation structures, anticipation animation structures, and reaction animation structures may be automatically or manually defined between adjacent animation structures. Users and applications may modify the default transition animation structures, anticipation animation structures, and reaction animation structures to fine tune the transitions between adjacent animation structures. Additionally, users and applications may add beat animations within animation structures.

In an embodiment, users and applications may perform operations on animation structures such as hold animation structures, anticipation animation structures, reaction animation structures, and transition animation structures as a whole, in addition to or instead of operations on individual computer graphics variable knots. For example, users or applications may select and modify all of the animation data associated with an animation structure using a single operation. In a further example, users or applications may scale animation data associated with an animation structure in terms of values or times. In still a further embodiment, users or applications may specify general parameters of an animation structure, which are then applied to create or modify the animation data associated with the animation structure. In yet a further embodiment, animation data, such as computer graphics variable knot values, retain their associations with animation structures. Thus, operations on animation structures, such as hold animation structures, anticipation animation structures, reaction animation structures, transition animation structures, and any other types of animation structures, are applied to all of the animation data included in these animation structures.

BRIEF DESCRIPTION OF THE DRAWINGS

The invention will be described with reference to the drawings, in which:

FIGS. 2A-2F illustrate example operations within an animation software interface according to an embodiment of the invention;

In the drawings, the use of identical reference numbers indicates identical elements.

DETAILED DESCRIPTION

Figure 1:
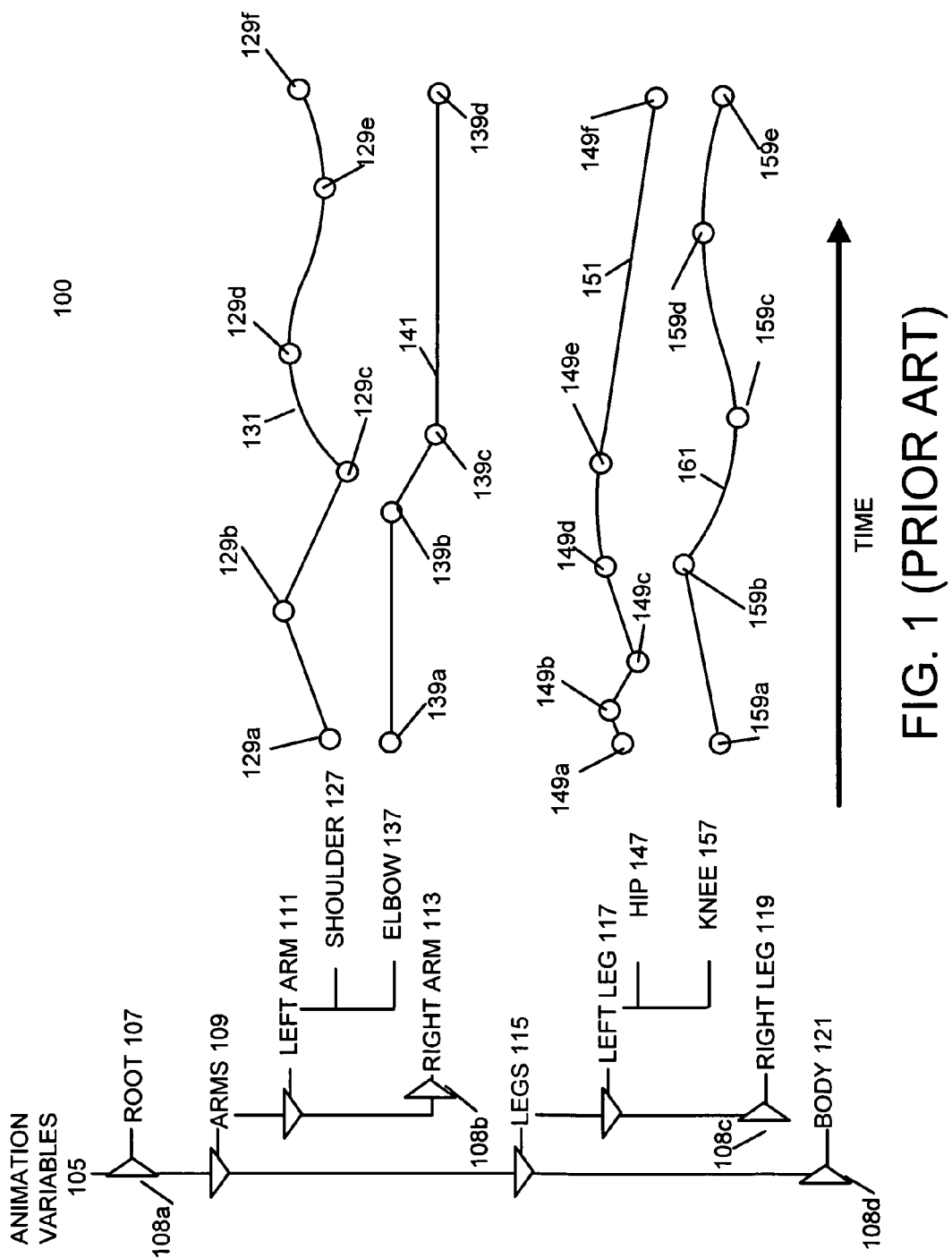
FIG. 1 illustrates an example prior animation software interface.

FIG. 1 illustrates an example prior animation software interface 100. Animation software interface 100 presents a set of animation variables 105. The animation software interface 100 arranges the set of animation variables 105 into groups and/or according to a hierarchy to assist users in finding and manipulating animation variables 105. Example animation software interface 100 includes a root group 107, an arms group 109, a legs group 115, and a body group 121. Groups may include one or more animation variables and/or one or more sub-groups. In example animation software interface 100, arms group 109 includes left arm group 111 and right arm group 113. Legs group 115 includes left leg group 117 and right leg group 119. In an embodiment, groups may be expanded to reveal their sub-groups and/or animation variables or collapsed to hide their sub-groups and/or animation variables. Example animation software interface 100 includes expansion controls 108, including expansion controls 108a, 108b, 108c, and 108d, for expanding or collapsing groups.

Example animation software interface 100 includes shoulder animation variable 127, elbow animation variable 137, hip animation variable 147, and knee animation variable 157. In this example, animation variables 105 including shoulder animation variable 127, elbow animation variable 137, hip animation variable 147, and knee animation variable 157 parameterized according to time input values.

Each of the animation variables 105 is associated with one or more knots or control points. Each knot specifies a value of the animation variable for a discrete or single time input value. Animation variable knots may be specified by users or by other applications, such as simulations, motion capture, and inverse kinematics systems. In general, the values of animation variables explicitly specified by knots or control points are referred to as authored values of the animation variables, regardless of how they are specified.

Animation and computer graphics software applications determine the values of computer graphics variables at input values without defined knots using interpolation or other techniques. For example, an animation software application may interpolate between two or more knots of an animation variable to determine the value of the animation variable for frames or time input values between the knots of the animation variable. Embodiments of animation software applications may use a variety of interpolation schemes, including linear, cubic, b-spline, Bezier, and Catmull-Rom techniques. In general, the values of computer graphics variables that are not specified by knots are referred to as the generated values of the computer graphics variable.

Example animation software interface 100 displays the authored and generated values of animation variables. In an embodiment, animation software interface 100 displays the authored values of animation variables as highlighted points and the generated values of animation variables as lines or curves, such as a spline curve. For example, animation software interface displays the authored values of shoulder animation variable 127 as points 129a, 129b, 129c, 129d, 129e, and 129f. Animation software interface 100 displays the generated values of shoulder animation variable 127 as curve 131. Similarly, animation software interface 100 displays the authored values of elbow animation variable 137 as points 139a, 139b, 139c, and 139d and its generated values as curve 141. Animation software interface 100 displays the authored values of hip animation variable 147 as points 149a, 149b, 149c, 149d, 149e, and 149f and its generated values as curve 151. Animation software interface 100 displays the authored values of knee animation variable 157 as points 159a, 159b, 159c, 159d, and 159e and its generated values as curve 161.

Typically, previous animation systems allowed users and applications to specify animation using authoring poses. In general, an authored pose is a set of one or more knots defined for the same or nearly the same time. For example, the knots 129a, 139a, 149a, and 159a are all associated with the same or nearly the same time value. Thus, this set of knots may be referred to as an authored pose.

Embodiments of the invention include an animation software interface that enables users to create and manipulate animation in terms of relationships between poses at different times, as opposed to the values of specific computer graphics variable knots. In one embodiment, poses defined by user are automatically associated with animation structures. An animation structure defines the pose or poses of an object over a time interval or duration, rather than at a single discrete time. Users define the timing and rhythm of animation by modifying these animation structures, for example by subdividing animation structures with additional poses, which are in turn are automatically associated with the subdivided animation structures. Embodiments of the invention allow users to manipulate animation structures defined over time intervals as a unit, as opposed to a set of unrelated computer graphics variable knots.

FIGS. 2A-2F illustrate example operations within an animation software interface according to an embodiment of the invention. FIG. 2A illustrates an example animation software interface 200a including a timeline 205. Timeline 205 is adapted to display poses of one or more objects in a scene as a function of time. Although omitted from the figures for clarity, timeline 205 may show one or more animation variables, and optionally the times and/or values of their knots. Embodiments of animation software interface 200a may use any measure of time, such as seconds or frames.

In example animation software interface 200a, a user or application has added a first pose A 210a of an object to the timeline 205 at the time value T1 212a. Embodiments of animation software interface 200a may allow users or applications to specify poses of objects using any technique known in the art, including defining values of computer graphics or animation variables at specific times, forward or inverse kinematics, graphical user interfaces, direct manipulation interfaces, motion capture data, sketch-based interfaces, simulation data, and procedurally generated animation.

Following the receipt of pose A 210a, an embodiment of the animation software interface 200a automatically defines an animation structure for a time duration or interval associated with this pose. In this example, the associated animation structure is referred to as a "hold" animation structure. In the example of FIG. 2A, because there are no other poses defined besides pose A 210a, the animation software interface 200a associates pose A 210a at time value T1 212a with the pose A hold animation structure 215a, which extends from time value T1 212a to the end of the shot or scene.

In an embodiment, an object is automatically held to pose A 210a for the duration of pose A hold animation structure 215a. In an embodiment, any modifications to pose A 210a will automatically be reflected in the pose A hold animation structure 215a. In a further embodiment, any additional animation data added within the time duration associated with pose A hold animation structure 215a will remain associated with pose A 210a and pose A hold animation structure 215a. Additional animation data can include beat animations, pose anticipations, and pose reactions, as discussed in detail below.

FIG. 2B illustrates an example animation software interface 200b. Continuing from the example of animation software interface 200a, a user or application has added pose B 210b at time value T2 212b to the timeline 205. In response to the addition of pose B 210b, an embodiment of the example animation software interface 200b modifies or subdivides the pose A hold animation structure 215a from the example of FIG. 2A to form pose A hold animation structure 215a', which extends from time value T1 212a to time value T2 212b. Additionally, pose B 210b is automatically associated with the pose B hold animation structure 215b, which extends from time value T2 212b to the end of the shot or scene. Pose B hold animation structure 215b may be created by modifying the duration of pose A hold animation structure hold animation structure 215a and adding pose B hold animation structure 215b, or by subdividing pose B hold animation structure 215a into new pose A hold animation structure 215a', which remains associated with pose A 210a, and pose B hold animation structure 215b, which is associated with added pose B 210b.

As discussed above, an object or model is held in pose A 210a for the duration of pose A hold animation structure 215a', from time value T1 212a to T2 212b, and in pose B 210b for the duration of pose B hold animation structure 215b, from time value T2 212b to the end of the shot or scene. Following the addition of pose B 210b and the creation of hold animation structures 215a' and 215b, an embodiment of the animation software interface 200b automatically propagates any modifications to pose A 210a or pose B 210b to the entire duration of hold animation structures 215a' and 215b, respectively. Similarly, any additional animation data added within the time durations associated with hold animation structures 215a' and 215b will remain associated their respective animation structures.

As shown in the example animation software interface 200b, an object or model will be held in pose A 210a up to time value T2 212b, at which time it will abruptly change to pose B 210b. In many cases, it is desirable for an object or model to smoothly change between poses. An embodiment of the animation software interface enables users and applications to specify pose transitions between pose holds.

FIG. 2C illustrates an example animation software interface 200c. Continuing from the example of animation software interface 200b, a user or application has modified the timing between hold animation structures 215a' and 215b by separating pose B hold animation structure 215b from the preceding pose A hold animation structure 215a'. In this example, pose B 210b is moved from time value T2 212b to time value T3 212c on timeline 205. This modifies pose B hold animation structure 215b from example 200b to form pose B hold animation structure 215b', which lasts from time value T3 212c to the end of the shot or scene. Embodiments of the animation software interface may automatically form transition animation structures when adjacent pose holds or other animation structures are separated.

Following the separation of pose B 210b from preceding pose A hold animation structure 215a', an embodiment of the animation software interface automatically creates a pose transition animation structure between these two poses. In an embodiment, a pose transition animation structure specifies a transition between two adjacent poses. Animation software applications may use any type of interpolation, simulation, kinematics, or blending technique known in the art to determine a visual transition between adjacent poses.

FIG. 2D illustrates an example animation software interface 200d including transition 220a animation structure between pose A and pose B in timeline 205. In an embodiment, transition animation structure 220a is defined between the end of the pose A hold animation structure 215a', at time value T2 212b, and the beginning of the pose B hold animation structure 215b', at time value T3 212c.

In an alternate embodiment, a transition animation between two adjacent animation structures is not associated with a specific animation structure. Instead, the transition animation is represented by the absence of a corresponding animation structure.

In an embodiment, users may modify the transition 220a to specify the length and characteristics of the transition between pose A and pose B. For example, modifications to the length of the transition animation structure 220a will also automatically change the ending time of pose A hold animation structure 215a' and the beginning time of pose B hold animation structure 215b'.

A further embodiment of animation software interface 200d may add anticipation and reaction animation structures to the adjacent animation structures when creating a transition between animation structure. An anticipation animation structure is a change to a pose at the end of its hold animation structure intended to show preparation for a transition animation. A reaction animation structure is a change to a pose at the beginning of a hold animation structure intended to show a response to the preceding transition. Both anticipation and reaction animation structures may include one or more modifications to the associated pose at one or more times within the hold animation structure. In an embodiment, anticipation and reaction animation structures may specify animation data for a portion of an object and rely on its associated hold or other animation structure to provide additional animation data.

Anticipations and reactions may be specified by any pose specification technique known in the art, including defining values of computer graphics or animation variables, forward or inverse kinematics, graphical user interfaces, direct manipulation interfaces, motion capture data, sketch-based interfaces, simulation data, and procedurally generated animation. In an embodiment, anticipations and reactions animation structures are nested or associated with their respective hold animation structures, so that any modifications to the pose defining a hold animation are automatically reflected in its associated anticipation and/or reaction animation structures.

An embodiment of animation software interface 200d automatically adds default anticipation and reaction animation structures to the animation structures preceding and following a transition animation structure, respectively. In the example of 200d, pose A anticipation animation structure 225a is added at the end of pose A hold animation structure 215a' and pose B reaction animation structure 225b is added to the beginning of pose B hold animation structure 215b'. In this example, pose A anticipation animation structure 225a exists within pose A hold animation structure 215a' from time values T4 212d to T2 212b. Similarly, pose B reaction animation structure 225b exists within pose B hold animation structure 215b' from time values T3 212c to T5 212e.

In an alternate embodiment, anticipation and/or reaction animation structures may be associated or nested within a transition animation structure, rather than within the animation structures adjacent to the transition animation structure as described above.

Following the addition of a default anticipation animation structure 225a and reaction animation structure 225b in example 200d, a user or application may modify the anticipation animation structure 225a, reaction animation structure 225b, and/or the transition animation structure 220a. Embodiments of the animation software interface 200e enable users and applications to modify anticipation animation structures, reaction animation structures, and/or transition animation structures in any arbitrary manner. For example, user and applications may modify the pose of an object or model; the animation of an object or model; the type of interpolation, simulation, kinematics, or other animation technique used; and/or the timing of anticipation, reaction, and transition animation structures.

FIG. 2E illustrates an example animation software interface 200e including modified a anticipation animation structure 225a', reaction animation structure 225b', and transition animation structure 220a'. In this example, anticipation animation structure 225a' may include modified posing or animation associated with pose A 210 prior to the transition animation structure. Modified transition animation structure 220a' may include a modified interpolation between pose A 210a and pose B 210b. Modified reaction animation structure 225b' may include different timing than default reaction animation structure 225b, changing the duration of reaction animation structure 225b' from time value T3 212c to time value T6 212f in timeline 205.

In addition to having models or objects held to a constant pose for a pose hold duration, as animation is gradually refined, additional animations may be added to the shot time interval covered by a hold animation structure to give the movement more detail and dynamics. This type of animation is referred to as beat animation, as hold animation structures often define an overall rhythm of animation. Beat animation may be associated with an animation structure, rather than defining a separate pose. An embodiment of the invention allows users and applications to add beat animation to the shot time interval covered by a hold animation structure. In an embodiment, a pose or animation data added at time values within a hold animation structure may be designated by a user or application as defining a separate hold animation structure or as a beat animation within a previously-defined animation structure. In an embodiment, adding beat animation at a shot time may reclassify the animation structure associated with this shot time as a beat animation structure or, alternatively, the hold animation may retain its classification even after a user has added animation within its shot time interval.

FIG. 2F illustrates an example animation software interface 200f including beat animation. In this example, animation data is added within the pose A hold animation structure 215a' time interval and designated as a beat animation. As a result, the pose hold animation structure 215a' is replaced in example 200f with the pose A beat animation structure 230 between time values T1 212a and T4 212d.

In general, animation data may be created and modified using animation structures, instead of or in addition to creating animation data at specific discrete times, using techniques including those shown in FIGS. 2A to 2F. Users and applications may define and edit the poses and timing of animation structures to block out the general form, timing, and rhythm of animations. Optional transition animation structures, anticipation animation structures, and reaction animation structures may be automatically or manually defined between adjacent hold animation structures. Users and applications may modify the default transition animation structures, anticipation animation structures, and reaction animation structures to fine tune the transitions between adjacent hold animation structures. Additionally, users and applications may change hold animation structures to beat animation structures.

In an embodiment, users and applications may perform operations on animation structures such as hold animation structures, anticipation animation structures, reaction animation structures, and transition animation structures as a whole, in addition to or instead of operations on individual computer graphics variable knots. For example, users or applications may select and modify all of the animation data associated with an animation structure using a single operation. In a further example, users or applications may scale animation data associated with an animation structure in terms of values or times. In still a further embodiment, users or applications may specify general parameters of an animation structure, which are then applied to create or modify the animation data associated with the animation structure. In yet a further embodiment, animation data, such as computer graphics variable knot values, retain their associations with poses and animation structures, such as hold animation structures, anticipation animation structures, reaction animation structures, and transition animation structures. Thus, operations on animation structures, such as hold animation structures, anticipation animation structures, reaction animation structures, transition animation structures, and any other types of animation structures, are applied to all of the animation data included in these animation structures.

Additionally, although FIGS. 2A-2F illustrate poses with respect to a time input, such as time or frame, embodiments of the animation software interface are also applicable to any type of computer graphics variable parameterized by inputs other than time.

Figure 3:
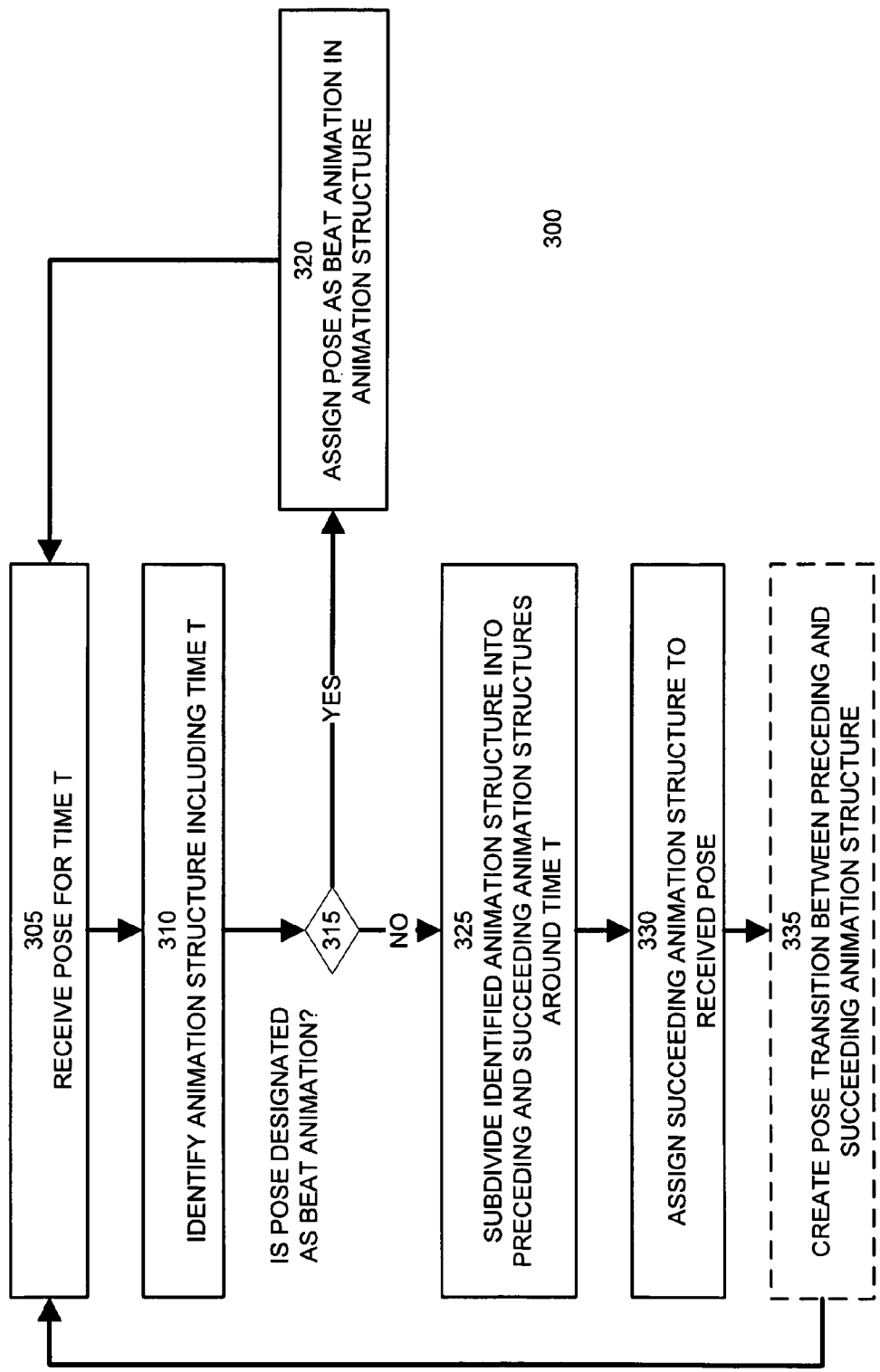
FIG. 3 illustrates a method of processing animation poses according to an embodiment of the invention.

As described above, an embodiment of the invention automatically associates animation structure with poses and animation data received from users and applications. FIG. 3 illustrates a method 300 of processing animation poses according to an embodiment of the invention.

Step 305 receives a pose or other animation data associated with at least one animation time T. Step 310 identifies a hold animation structure including the time T associated with the received pose.

Decision block 315 evaluates the received pose or other animation data to determine if it has been designated as beat animation. In an embodiment, a user or application designates poses or other animation data as beat animation manually. If the pose or other animation data is designated as beat animation, then method 300 proceeds to step 320. Step 320 assigns the received pose as beat animation within the identified hold animation structure. Following step 320, method 300 proceeds back to step 305.

Conversely, if decision block 315 determines that the received pose is not designates as beat animation, then method 300 proceeds to step 325. Step 325 subdivides the identified hold animation structure around time T into two new hold animation structures. The hold animation structure preceding the time T remains associated with the same pose as the original, undivided hold animation structure. Step 230 assigns the received pose to the hold animation structure succeeding or following the time T.

Optional step 335 creates a transition animation structure between the two new hold animation structures. The transition animation structure may include a anticipation and a reaction animation structures within the two newly defined hold animation structures as well. Following step 335, method 300 returns to step 305 to receive additional poses or other animation data.

Figure 4A:
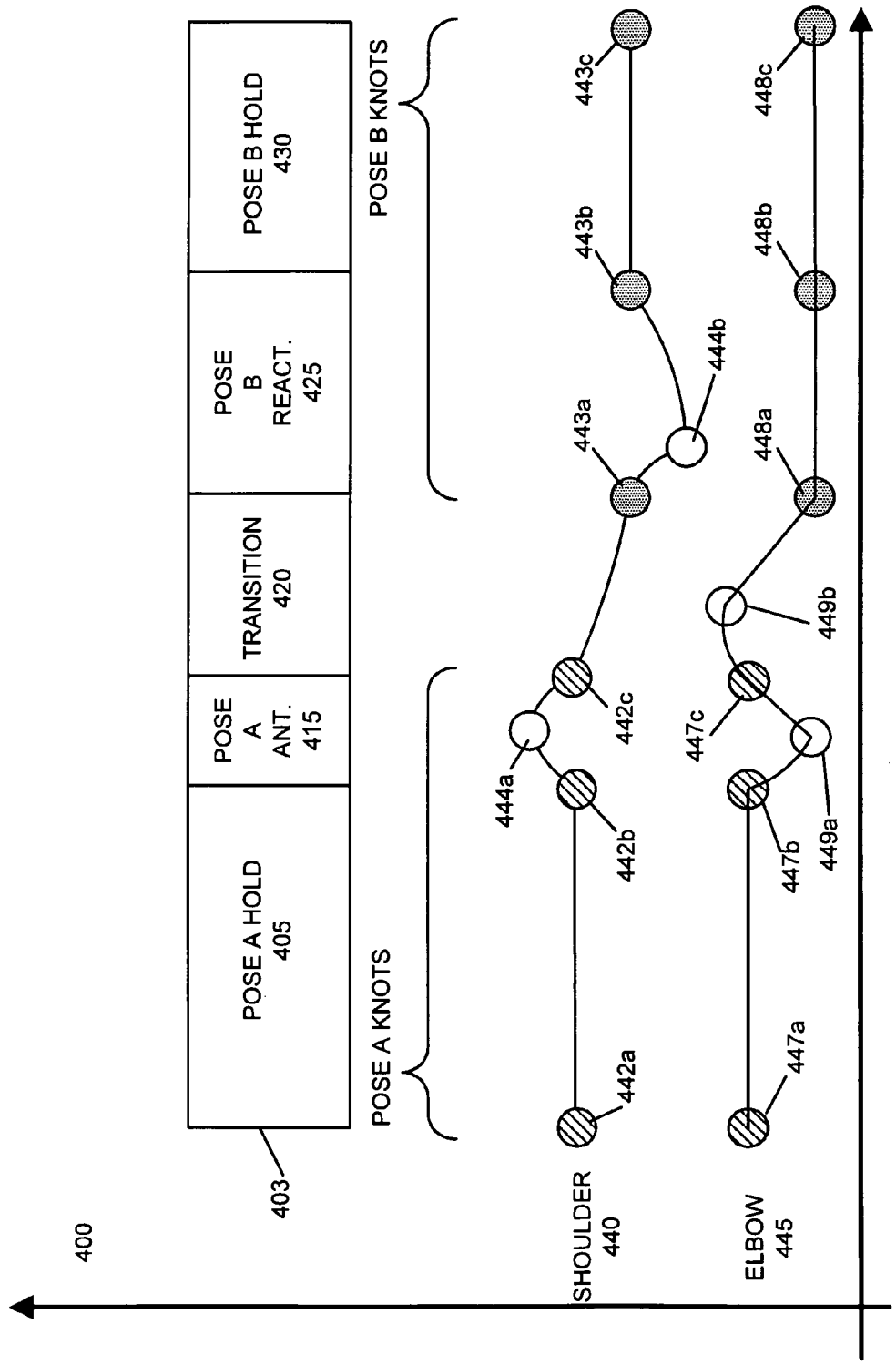
FIGS. 4A and 4B illustrate example implementations of an animation software interface according to an embodiment of the invention.
Figure 4B:
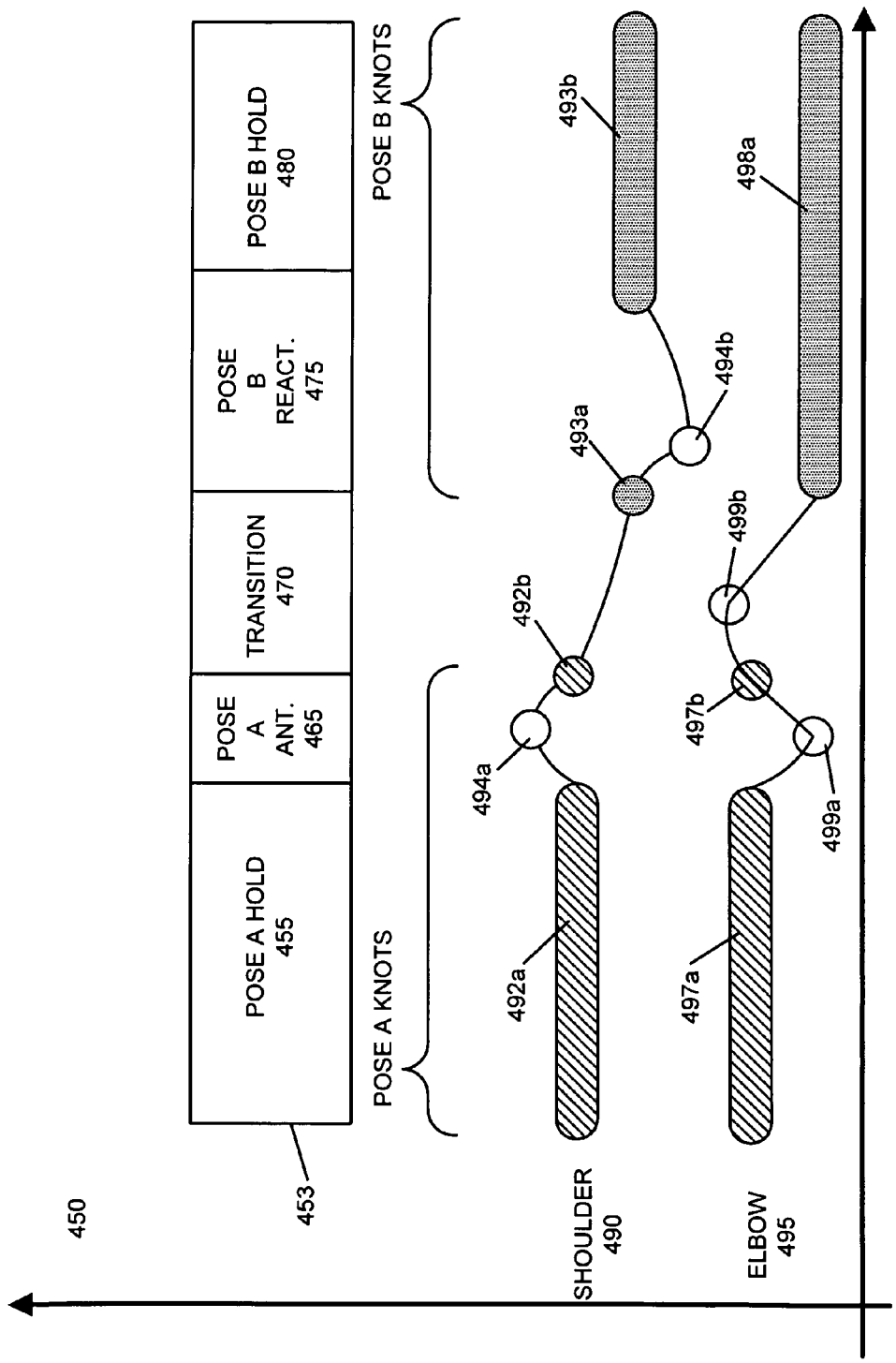

Animation structures, such as hold animation structures, anticipation animation structures, reaction animation structures, and transition animation structures, can be implemented by animation software applications in numerous different ways. FIGS. 4A and 4B illustrate example implementations of an animation software interface according to an embodiment of the invention.

FIG. 4A illustrates a first example implementation 400 of animation structures using discrete computer graphics variable knots. Example implementation 400 includes a set of animation structures 403 and two computer graphics variables 440 and 445, which represent shoulder and elbow computer graphics variables. Computer graphics variables 440 and 445 are shown for the purposes of illustration and typical implementations can include any arbitrary number of computer graphics variables.

Animation structures 403 include pose A hold animation structure 405, pose A anticipation animation structure 415, transition animation structure 420, pose B reaction animation structure 425, and pose B hold animation structure 430. In this example, the pose of an object at a discrete time is represented by computer graphics variable knots. In example implementation 400, each knot represents the value of a computer graphics variable at a discrete time.

Computer graphics variable knots are associated with one or more animation structures. For example, knots 442a, 442b, 442c, and 444a of shoulder computer graphics variable 440 and knots 447a, 447b, 447c, and 449a of elbow computer graphics variable 445 are associated with pose A animation structures: pose A hold animation structure 405 and pose A anticipation animation structure 415. In this example, any operations to pose A hold animation structure 405 may affect knots 442a, 442b, 442c, and 444a of shoulder computer graphics variable 440 and knots 447a, 447b, 447c, and 449a of elbow computer graphics variable 445. Operations to pose A anticipation animation structure 415 may affect knots 442b, 442c, 444a, 447b, 447c, and 449a. Similarly, knots 443a, 443b, 443c, 448a, 448b, 448c, and 444b are associated with pose B animation structures: pose B reaction animation structure 425 and pose B hold animation structure 430. Operations on pose B hold animation structure 430 as a whole may affect all of these knots, while operations on pose B reaction animation structure 425 may affect knots 443a, 443b, 444b, 448a, and 448b. Knot 449b is associated with transition animation structure 430. Any operation on transition animation structure will affect knot 449b.

Additionally, because each knot represents a value of a computer graphics variable at a discrete time, two or more knots may be associated together to specify the value of a computer graphics variable over a time duration. For example, knots 442a, 442b, and 442c are associated with pose A hold animation structure 405. A modification to pose A defining pose A hold animation structure 405 may knots 442a, 442b, and 442c to the same value. Similarly, knots 447a, 447b, and 447c are also associated with pose A hold animation structure 405 and will have the same value.

In example implementation 400, animation structures are maintained in part by associating knots with one or more animation structures. For example, knots 444a and 449a are associated with both pose A hold animation structure 405 and with pose A anticipation animation structure 415. Additionally, animation structures can be implemented by restricting two or more knots to have the same value. For example, knots 442a, 442b, and 442c may be restricted to have the same value. Knots 447a, 447b, and 447c also may be restricted to the same value.

An alternative implementation of animation structures can include a duration knot, which has assigns a value to a computer graphics variable over an arbitrary time interval, in addition to knots assigning values to discrete times. FIG. 4B illustrates an example implementation 450 of animation structures 453 using discrete and duration computer graphics variable knots. Computer graphics variables 490 and 495 are included in example 450 for the purposes of illustration and typical implementations can include any arbitrary number of computer graphics variables.

Animation structures 453 include pose A hold animation structure 455, pose A anticipation animation structure 465, transition animation structure 470, pose B reaction animation structure 475, and pose B hold animation structure 480. In example implementation 450, knots may represents the value of a computer graphics variable at a discrete time or over a time interval.

Computer graphics variable knots are associated with one or more animation structures. For example, knots 492a, 492b, and 494a of shoulder computer graphics variable 490 and knots 497a, 497b, and 499a of elbow computer graphics variable 495 are associated with pose A animation structures: pose A hold animation structure 455 and pose A anticipation animation structure 465. In this example, any operations to pose A hold animation structure 455 as a whole may affect all of these knots. Similarly, knots 493a, 493b, 494b, and 498a are associated with pose B animation structures: pose B reaction animation structure 475 and pose B hold animation structure 480. Operations on pose B as a whole may affect all of these knots. Knot 499b is associated with transition animation structure 470. Any operation on transition animation structure 470 may affect knot 499b.

In this example implementation 450, knots 492a, 493b, 497a, and 498a specify the values of computer graphics variables over time intervals. Knots 492b, 493a, 494a, 494b, 497b, 499a, and 499b specify the values of computer graphics variables at discrete times.

Figure 5:
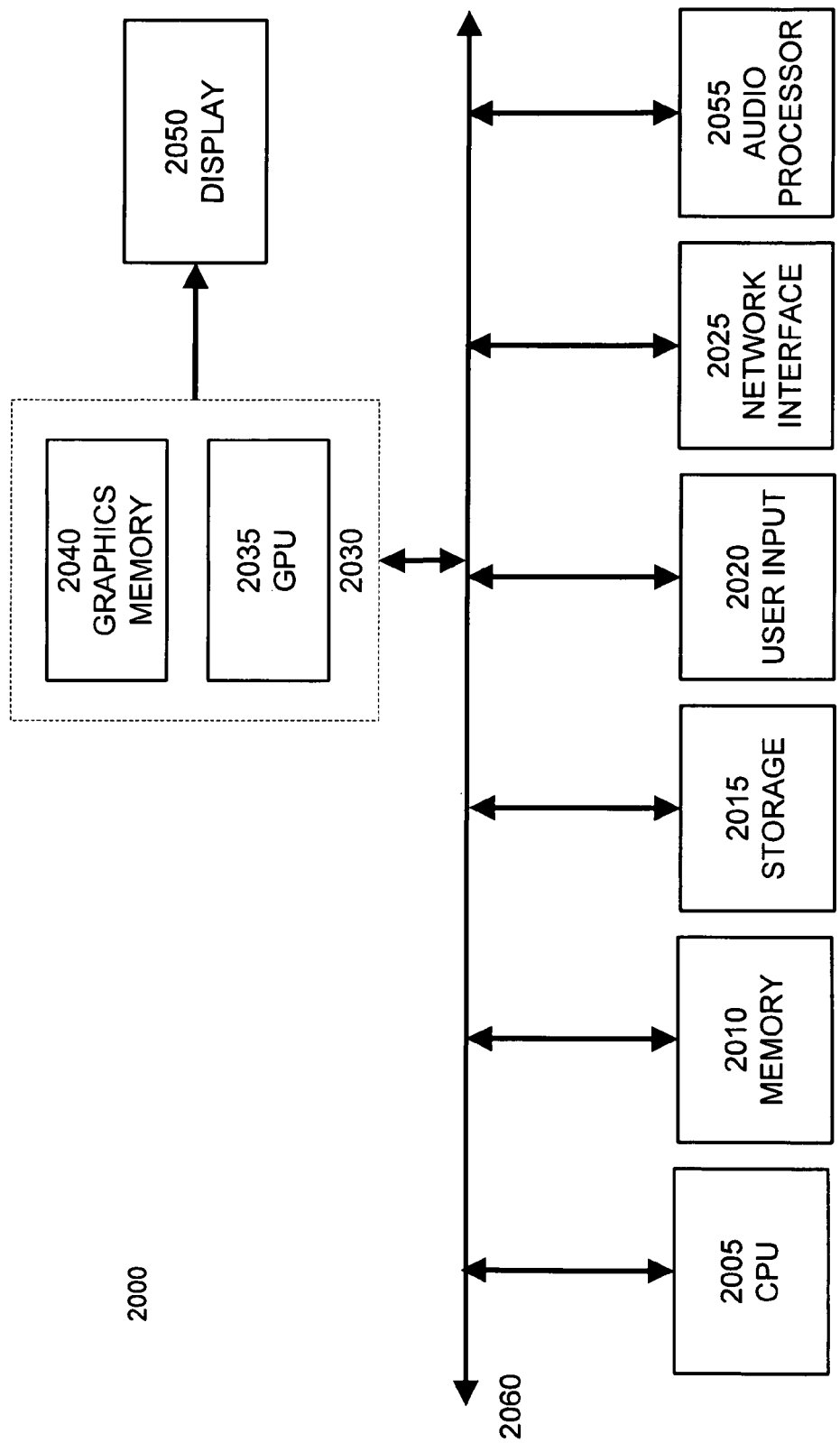
FIG. 5 illustrates a computer system suitable for implementing an embodiment of the invention.

FIG. 5 illustrates a computer system suitable for implementing an embodiment of the invention. FIG. 5 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, single or multitouch touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating animation data for at least one rendered image of a computer graphics scene, the method comprising:
   receiving animation data defining at least a portion of a first pose of an object at a first shot time;
   identifying a previously defined first hold animation structure including the first shot time, wherein the first hold animation structure defines at least a second pose of the object from a second shot time prior to the first shot time up to a third shot time following the first shot time;
   replacing the first hold animation structure with a second hold animation structure defined as beginning at the second shot time and ending before the first shot time and a third hold animation structure defined from after the second hold animation structure up to the third shot time;
   associating the second pose of the object with the second hold animation structure, such that the object is posed according to at least the second pose during at least a portion of the second hold animation structure;
   associating the first pose of the object with the third hold animation structure, such that the object is posed according to at least the first pose during at least a portion of the third hold animation structure; and
   rendering at least one image of the computer graphics scene including at least a portion of the object in the first pose during the third hold animation structure.

2. The method of claim 1, wherein the previously defined first hold animation structure is defined in response to receiving animation data defining the second pose of the object at the second shot time.

3. The method of claim 1, wherein replacing the first hold animation structure comprises:
   determining if the animation data defining the portion of the first pose of the object at the first shot time is included in a beat animation associated with the second pose of the object;
   in response to the determination that the first pose of the object is included in the beat animation, defining a first beat animation within the first hold animation structure, such that the first beat animation changes the object from the second pose to the portion of the first pose within the first hold animation structure; and
   in response to the determination that the first pose of the object is not included in the beat animation, replacing the first hold animation structure with the second hold animation structure.

4. The method of claim 3, wherein determining if the animation data defining the portion of the first pose of the object is included in a beat animation comprises:
   determining if the animation data has been designated as defining beat animation.

5. The method of claim 4, wherein the designation defining animation data as a beat animation is provided by a user.

6. The method of claim 1, comprising:
   defining a transition animation between the second hold animation structure and the third hold animation structure.

7. The method of claim 6, wherein defining the transition animation comprises:
   defining a transition animation structure including the transition animation.

8. The method of claim 6, comprising:
   defining a pose anticipation in the second hold animation structure.

9. The method of claim 6, comprising:
   defining a pose reaction in the third hold animation structure.

10. The method of claim 1, wherein the first shot time is expressed in a form selected from a group consisting of: units of time; frames of animation; units based on time; and units based on frames of animation.

11. The method of claim 1, wherein the animation data is selected from a group consisting of:
    user-provided animation data; application-provided animation data; forward kinematics animation data; inverse kinematics animation data; procedurally-generated animation data; simulation data; and motion capture data.

12. The method of claim 1, wherein replacing the first hold animation structure with the second hold animation structure and the third hold animation structure comprises:
    subdividing the first hold animation structure to create at least the second hold animation structure and the third hold animation structure.

13. The method of claim 1, wherein replacing the first hold animation structure with the second hold animation structure and the third hold animation structure comprises:
    removing the first hold animation structure; and
    adding the second hold animation structure and the third hold animation structure.

* * * * *